…

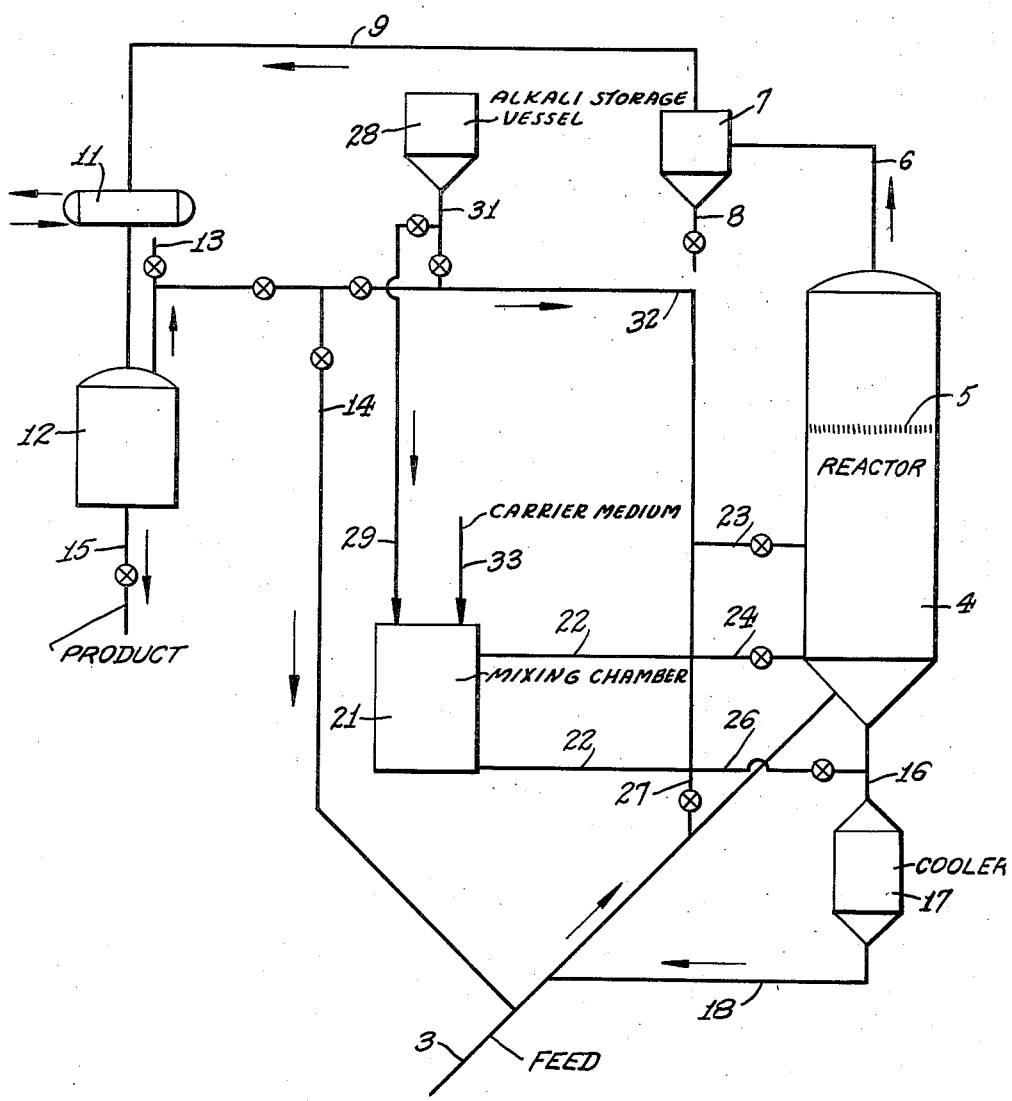

UNITED STATES PATENT OFFICE 2,598,503

SYNTHESIS OF ORGANIC COMPOUNDS

William P. Burton, Orange, N. J., assignor to The M. W. Kellogg Company, Jersey City, N. J., a corporation of Delaware Application March 29, 1947, Serial No. 738,237

11 Claims. (Cl. 260—449.6)

This invention relates to an improved method for hydrogenating carbon oxides to produce hydrocarbons having more than one carbon atom per molecule and oxygenated organic compounds. In one aspect this invention relates to the hydrogenation of carbon monoxide in the presence of a finely divided hydrogenation catalyst under conditions such that organic compounds are produced. The improved process is applicable also in reacting hydrogen with carbon dioxide and organic compounds containing the carbonyl group and herein designated as carbon oxides, whose reaction with hydrogen is promoted by catalysts which are effective with carbon monoxide, such as ketones, aldehydes, acyl halides, organic acids and their salts and esters, acid anhydrides, and amines. In the following description of the invention the hydrogenation of carbon monoxide will be referred to specifically. It will be understood, however, that the invention is of wider application including within its scope hydrogenation of any suitable carbon oxides.

It has been known for some time that hydrogen and carbon monoxide may be made to react exothermically in the presence of a catalyst under specific reaction conditions to form hydrocarbons and oxygenated compounds. In general, the synthesis of these organic compounds by the hydrogenation of carbon monoxide is accomplished in the presence of a metal or an oxide of a metal chosen from group VIII of the periodic table as a catalyst, at pressures below about 500 pounds per square inch gage and at temperatures below about 750° F. for the production of hydrocarbons and oxygenated organic compounds, and at pressures between about 1000 and about 10,000 pounds per square inch gage and at temperatures above 750° F. for the synthesis of oxygenated organic compounds as the major product.

The synthesis feed gas or reaction mixture comprises a mixture of about 1 to 2 mols of hydrogen per mol of carbon monoxide and may be prepared by the catalytic conversion of natural gas, steam, and carbon dioxide, by the partial oxidation of natural gas with oxygen, or by gasification of coal.

Of the various methods utilized to effect hydrogenation of carbon monoxide, such as by fixed or stationary catalyst technique, or by finely divided fluidized catalyst technique, this invention has particular application to the finely divided fluidized catalyst technique.

An object of this invention is to provide an improved process for the synthesis of organic compounds.

Another object of this invention is to provide a process for the production of oxygenated organic compounds.

Still another object of this invention is to provide a method for maintaining the activity and selectivity of the catalyst during the hydrogenation of carbon monoxide.

It is another object of this invention to provide a method for removing exothermic heat of reaction liberated during the hydrogenation of carbon monoxide.

Various other objects and advantages will become apparent to those skilled in the art from the accompanying description and disclosure.

A metal or metal oxide hydrogenation catalyst containing between about 0.1 and about 3.0 per cent by weight of an oxide of potassium has been found to be very effective for the hydrogenation of a carbon oxide to produce a high yield of organic compounds. For maximum yields and selectivity a metallic iron or iron oxide catalyst containing between about 0.2 and about 2.0 per cent by weight potassium oxide, $K_2O$, is preferred. A potassium oxide content above about 2.5 or about 3 weight per cent results in excessive formation of wax and carbonaceous deposits on the catalyst, which deposits decrease the activity and life of the catalyst; while a potassium oxide content below about 0.1 per cent results in substantially increased yields of carbon dioxide, methane, ethane, and other relatively low molecular weight hydrocarbons.

The amount of potassium oxide in the catalyst is critical with respect to the type of products produced. Thus, for the production of oxygenated organic compounds, especially the relatively high molecular weight alcohols and organic acids, the catalyst must contain at least about 0.8 weight per cent, preferably between about 1.0 and about 2.0 weight per cent, potassium oxide. When it is desired to produce relatively high molecular weight hydrocarbons accompanied by a minimum amount of oxygenated organic compounds, the catalyst must contain between about 0.2 per cent and about 0.7 per cent potassium oxide. The per cent potassium oxide is based in this specification on the total amount of catalytic metal present in the catalyst calculated as the elementary metal.

A high alkali metallic iron catalyst containing between about 0.8 per cent and about 2.5 per cent potassium oxide produces a much larger amount of oxygenated compounds than a metallic iron catalyst of lower potassium oxide content under comparable reaction conditions. In fact, in some instances, as much as four or five times as much oxygenated compounds are produced by such a high alkali catalyst as with a lower alkali catalyst. Of the oxygenated compounds produced with the high alkali catalyst, the normal alcohols, such as ethanol, propanol, butanol, and pentanol, along with such organic acids as acetic, propionic, and butyric acids comprise the major portion of the organic compounds. In contrast, with a low alkali catalyst substantially negligible amounts of organic acids are produced and generally relatively smaller amounts of oxygenated compounds are produced. It has also been noted that with the high alkali catalyst of the present invention, a substantial proportion of the relatively low molecular weight hydrocarbons produced are olefinic and are present in the product in a relatively larger proportion than in the product of the low alkali catalyst. It is possible to operate with the high alkali catalyst at relatively higher temperatures than is possible with low alkali catalysts without excessive formation of coke on the catalyst.

On the other hand, a low alkali metallic iron catalyst containing between about 0.2 per cent and about 0.7 per cent potassium oxide produces the maximum yield of hydrocarbons having more than one carbon atom per molecule. In the hydrogenation of carbon monoxide with a low alkali catalyst the maximum yield of hydrocarbons of high quality boiling within the gasoline range are obtained. Furthermore, the low alkali iron catalyst produces a hydrocarbon fraction useful as a diesel fuel of much higher quality than that produced with a high alkali catalyst. Relatively higher space velocities for somewhat lower temperatures may be used with the low alkali catalyst than with the high alkali catalyst for an equivalent conversion of carbon monoxide.

Although potassium oxide has been found to be the much preferred activating compound when incorporated with a hydrogenation catalyst comprising a metal and/or metal oxide, other potassium compounds and other inorganic compounds of alkali metals and alkaline earths, such as sodium, barium, calcium, and lithium, are capable of being incorporated with the hydrogenation catalyst in the above ranges previously qualified with respect to $K_2O$ when calculated as the oxide and based on total catalytic metal calculated as the elementary metal. Preferably, such activating compounds of alkali metals and alkaline earths contain oxygen in the form of the oxide, hydroxide, carbonate, sulphate, silicate, phosphate, aluminate, chromate, nitrate, and borate. Potassium carbonate, nitrate, hydroxide, and chloride have shown very good results; particularly, when these compounds were incorporated with a hydrogenation catalyst comprising iron as the major component in quantities greater than about 0.8 weight per cent (calculated as $K_2O$) high yields of oxygenated organic compounds were produced. Mixtures of these compounds may be used as the activating material without departing from the scope of this invention, and when mixtures are used the alkali content calculated as the oxide is considered as either the total quantity of compounds or the quantity of any single compound.

The activating compound, such as $K_2O$, may be incorporated with the hydrogenation catalyst in a solid solution or a fused condition therewith, or it may be merely on the surface of the hydrogenation catalyst uncombined therewith in any way. For example, a naturally occurring magnetite may be mixed with an appropriate amount of potassium hydroxide or potassium carbonate and the resulting mixture fused. The fused mixture is then pulverized and reduced with hydrogen at a temperature between about 900° F. and about 1600° F. In this manner of preparation the potassium oxide is present in the ultimate catalyst in a fused condition with iron. In another manner of preparation in which the alkali is on the surface of the catalyst uncombined with the iron, naturally occurring magnetite is pulverized with or without prior fusion (above 2000° F.) or calcination (above 1200° F.), mixed with potassium carbonate, and the resulting mixture reduced. For further details and other methods of preparing iron catalysts containing promoters attention is directed to the co-pending application, Serial No. 735,536, filed March 18, 1947, now U. S. Patent 2,543,327, issued February 27, 1951, of Henry G. McGrath and Louis C. Rubin.

A preferred embodiment of this invention involves flowing a gaseous mixture comprising hydrogen and a carbon oxide to be hydrogenated upwardly in a reaction zone in contact with a mass of finely divided catalyst containing iron as the major component and an appropriate amount of potassium calculated as the oxide, for producing the desired product. The hydrogen and carbon oxide reactants are passed as gases through the reaction zone, under conditions effective to react all, or a major portion, of the carbon oxide reactant. The gaseous mixture is passed upwardly through the mass of catalyst at a velocity sufficient to suspend or entrain the catalyst mass in a fluidized condition in the gas stream. Preferably, the velocity of the gas stream passing through the reaction zone is sufficiently low to maintain the catalyst mass in a dense, fluidized pseudo-liquid condition. However, the velocity may be sufficiently high to entrain at least a substantial portion of the finely-divided catalyst in the gas stream to form a continuous fluidized catalyst phase which circulates with the flowing gas stream, without departing from the scope of this invention. In the former condition the catalyst mass may be said to be suspended in the gas stream, but not entrained or carried therein in the sense that there is movement of the catalyst mass as such in the direction of flow of the gas stream. When operating with the catalyst in the pseudo-liquid condition, it is preferred to maintain the upward velocity of the gas stream sufficiently high to maintain the fluidized catalyst mass in a highly turbulent condition in which the catalyst particles circulate at a high rate in a stationary pseudo-liquid mass. In this pseudo-liquid condition of operation a small proportion of catalyst in the fluidized mass may become entrained in the gas stream emerging from the upper surface of the fluidized mass whereby catalyst thus entrained is carried away from the mass.

As used herein, fluidized condition of the catalyst refers to that condition of the catalyst either when it is in a pseudo-liquid condition above described and/or when it is entrained in the gaseous reaction mixture such that the catalyst is carried along with the gases in the reaction zone.

The charging rate in the present process is defined by reference to the rate at which the carbon oxide is charged, in terms of standard cubic feet, in the gas form, of the carbon oxide, per hour, per pound, of the metal catalyst in the dense pseudo-liquid mass of catalyst in the reaction zone. The fluidized process is preferably operated at a minimum space velocity equivalent to charging rate of about 1.0 standard cubic foot of the carbon oxide reactant, per hour, per pound of the metal catalyst in the dense catalyst phase. A standard cubic foot of the carbon oxide is that quantity of a normally gaseous carbon oxide which would occupy one cubic foot at atmospheric pressure at 60° F., or an equivalent quantity of a normally liquid carbon oxide reactant. Generally, with fluidized dense phase operation and pressures between 150 and 300 pounds per square inch gage with the high alkali catalyst, a space velocity between about 4 and about 10 standard cubic feet of the carbon oxide reactant, per hour, per pound of the iron catalyst is used. With the low alkali catalyst a space velocity between about 10 and about 25 is used.

The catalyst employed in the present invention is a finely divided powder comprising a metal and/or metal oxide, such as a metal of group VIII of the periodic table, containing the appropriate amount of alkali metal or alkaline earth compound calculated as the oxide, which is or becomes in the reaction zone a catalyst for the reaction, or a mixture of such metal or metal oxide and other catalytic materials or noncatalytic materials. While the catalyst powder consists essentially of such catalytic metal and/or metal oxide containing, for example, potassium oxide, it may include also a minor amount of promoting ingredients, such as alumina, silica, titania, thoria, manganese oxide, magnesia, etc.

In this specification and claims the catalyst employed is described by reference to its chemical composition when first contacted with the reactants.

The catalyst is employed in a fine state of subdivision. Preferably, the powdered catalyst initially contains no more than a minor proportion by weight of material whose particle size is greater than 250 microns. Preferably also, the greater proportion of the catalyst mass comprises material whose particle size is smaller than 100 microns, including at least 25 weight per cent of the material in particle sizes smaller than 40 microns. A highly desirable powdered catalyst comprises at least 75 per cent by weight of material smaller than 150 microns in particle size, and at least 25 per cent by weight smaller than about 40 microns in particle size.

In the preferred form of the invention with the catalyst present in a pseudo-liquid condition, the powdered catalyst mass is maintained in a reactor substantially larger than the volume occupied by the catalyst mass in the fluidized condition. In this operation all but a minor proportion of the catalyst mass is contained in the dense fluidized pseudo-liquid mass, which may be designated as the dense phase of the catalyst. The dense phase of the catalyst occupies the lower part of the reactor while that part of the reactor above the dense phase is occupied by a mixture of gases and powdered catalyst in which the catalyst concentration is much lower, and of a different order of magnitude, than the concentration of the catalyst in the dense phase. This diffuse phase may be said to be a disengaging zone in which the solids lifted above the dense phase by the gas stream are disengaged therefrom and returned to the dense phase to the extent that such solids are present in the diffuse phase in excess of the carrying capacity of the gas stream at the superficial velocity of the gas stream. The latter is the velocity at which the gas stream would flow through the reactor in the absence of catalyst. In the dense phase the concentration of the catalyst in the gas stream varies from a maximum near the gas inlet to a minimum in the upper part of this phase. Likewise the concentration of catalyst in the diffuse phase varies from a maximum near the upper surface of the dense phase to a minimum in the upper part of the reactor. Between the dense phase of high average concentration and the diffuse phase of low average concentration there is a relatively narrow zone in which the concentration of solids in the gas stream changes in a short space from the high concentration of the dense phase to the low concentration of the diffuse phase. This zone has the appearance of an interface between two visually distinct phases.

This operation ordinarily involves employment of catalyst powders and gas velocities such that a relatively small proportion of the dense fluidized catalyst mass is carried away by entrainment, and it is necessary, therefore, to provide means in the reactor for separating such entrained catalyst and returning it to the dense phase, or to provide means externally of the gas reactor to separate entrained catalyst from the gas stream and return it to the reactor, or otherwise to recover catalyst from the product gas stream.

When catalyst is permitted to pass out of the reactor by entrainment in the gas stream in either the pseudo-liquid operation or the continuous phase operation, it is necessary to return such catalyst to the reactor, or replace it with fresh or revivified catalyst, in order to maintain the desired volume of fluidized catalyst in the reaction zone.

The pseudo-liquid operation in which the finely powdered catalyst is employed in a form comprising reduced iron as the major component and containing at most minor proportions of promoting agents, other than potassium oxide or other alkali metal or alkaline earth compounds, provides very high catalyst concentrations in the reaction zone. The employment of the finely powdered metal catalyst in a fluidized bed with efficient cooling means also is a factor in permitting the use of high catalyst concentrations, since it facilitates the removal of heat from the relatively concentrated reaction zone. The pseudo-liquid operation, employing the finely divided metal catalyst, results in initial catalyst concentrations of at least about 30 pounds per cubic foot of the fluidized dense catalyst phase, while the preferred gas velocities result in initial concentrations of 40 to 120, or more, pounds per cubic foot of dense phase. It will be understood that these figures refer to the initial average concentration in the dense phase. The accumulation of reaction products on the catalyst particles as the operation proceeds reduces the catalyst density and increases the bulk of the dense fluidized mass.

With a reduced iron catalyst containing for example an oxygen-containing compound of potassium, temperatures in the range of about 350 to about 750° F. are employed. Usually about 30° F. to about 50° F. higher temperatures are necessary with the high alkali catalyst than with the low alkali catalyst for an equivalent reaction. With the iron catalyst, pressures between atmospheric pressure and the maximum pressure at which condensation in the catalyst bed is avoided may be employed. It is desirable, however, to employ pressures of at least 50 p. s. i. and preferably about 150 to about 500 p. s. i.

In this specification, pressures are expressed as pounds per square inch gage and gas volumes as cubic feet measured at 60° F. and atmospheric pressure.

The linear velocity of the gas stream passing upwardly through the dense phase is conveniently expressed in terms of the superficial velocity, which is the linear velocity the charge gas stream would assume if passed through the reactor at operating conditions in the absence of catalyst and takes into account the shrinkage in volume caused by the reaction, and is, preferably, in the range of from 0.1 to 6 feet per second. When operating with a continuous catalyst phase in which the catalyst is entrained in the flowing gaseous mixture, velocities as high as 40 feet per second may be used.

The reactants are passed into and through the reaction zone at a space velocity equivalent to at least 1.0 standard cubic feet of the carbon oxide, per hour, per pound of metal catalyst in the dense catalyst phase. In the hydrogenation of carbon monoxide with a catalyst comprising reduced iron as the major component it is preferred to operate at a space velocity equivalent to at least 2.0 standard cubic feet of carbon monoxide per hour, per pound of reduced iron in the dense catalyst phase. The charging rate is defined by reference to the carbon monoxide reactant, since the ratio of the hydrogen reactant to the carbon monoxide reactant in the charge gas may vary within wide limits. This ratio of hydrogen to carbon monoxide is usually in excess of about 0.7:1 and preferably at least 1:1 and often as high as 10:1. At the 1:1 ratio the preferred charging rate of hydrogen and carbon monoxide would, therefore, be at least 4.0 standard cubic feet per hour, per pound of reduced iron in the dense catalyst phase. At a 2:1 ratio this preferred minimum rate would be 6.0 standard cubic feet of hydrogen and carbon monoxide.

The volume of reactants per hour per volume of dense pseudo-liquid catalyst phase depends upon the charge rate and also upon the concentration of catalyst in the dense phase, the latter being affected by the condition of the catalyst and the gas velocity. At the preferred gas velocities mentioned above for the pseudo-liquid operation, and when employing an iron-containing catalyst, the minimum space velocity may be defined as 2 cubic feet of carbon monoxide, per hour, per pound of catalyst.

According to the preferred embodiment of this invention a fresh feed gas having an $H_2$:CO ratio higher than the mol ratio in which these compounds are converted to other compounds is employed and the ratio of hydrogen to carbon monoxide in the charge to the reactor is increased to the desired figure by recycling a portion of the unconverted gas, after removal of part or all of the product liquid. A gas containing excess hydrogen is processed under conditions effective to react all, or a major proportion, of the carbon monoxide, and a portion of the product mixture, after removal of the greater part of the liquid product, is recycled in volumetric ratios, to the fresh feed gas, of about 0.5:1 to about 10:1.

Fluid operations are carried out at temperature levels which are relatively high as compared to those which would be permissible in fixed catalyst bed operations under comparable operating conditions. This results from the excellent heat transfer capacity of the fluidized mass of finely divided iron or iron oxide and the effect of excess hydrogen in minimizing carbon formation. It is preferred to operate at whatever temperature level, in the range of about 350° F. to about 750° F., is necessary to effect high conversion of carbon monoxide when treating a gas charge containing more hydrogen than carbon monoxide, at space velocities equivalent to at least about 2 standard cubic feet of carbon monoxide, per hour, per pound of iron catalyst in the dense phase.

In hydrogenating carbon monoxide with an alkali catalyst under the operating conditions previously described to produce organic compounds, it has been found that the alkali content of the catalyst decreases during its use to such an extent that the alkali content of the catalyst does not correspond to that critical amount necessary to produce the desired product. Furthermore, after continuous and prolonged use the alkali content of the catalyst may be substantially completely dissipated. The decrease in alkali content of the catalytic material is especially noticeable in those catalysts in which the alkali has been incorporated without fusion. It is believed that the decrease in alkali content of the catalyst on use is caused by the volatility of the alkali compound (alkali metal or alkaline earth compound) in the catalyst at the temperatures and pressures of reaction or at the temperatures and pressures necessary during repeated regeneration of the catalyst. In the latter respect, the catalyst is usually regenerated by reducing with hydrogen at temperatures similar to those temperatures used in reducing the original catalyst, i e., usually between about 900° F. and about 1600° F., or by roasting at about 1200° F. in air followed by the reduction. The above reason for the decrease in alkali content of the catalyst is offered merely as a possible explanation but is not considered unnecessarily limiting to the present invention. Other reasons may also account for the decrease in alkali content, such as the reaction of the alkali compound with the reactants, etc.

The hydrogenation of carbon monoxide in the presence of fluidized synthesis catalyst at a temperature between about 350° F. and about 750° F. results in a decrease of the alkali content of the catalyst between about 0.0005 and about 0.1 pound of alkali calculated as the oxide, per hour, per ton of the active catalytic material. The actual depletion of the alkali content of the catalyst within the above range will depend upon the correlation of temperatures and pressures of reaction as well as the manner in which the alkali compound was incorporated in the catalyst, and to some extent upon the velocity of the gaseous mixture. The decrease of the alkali content will be about 0.02 to about 0.05 pound of alkali, per hour, per ton of ferruginous material calculated as the elemental metal when using an iron-containing catalyst at a temperature between about 450° F. and about 700° F.

In order to maintain the alkali content of the catalyst at the desired level according to this invention, an alkali compound, which may correspond to the compound used to impregnate the catalyst itself, is injected into the reaction zone in an amount sufficient to compensate for the loss of alkali content during the process. The amount of alkali compound injected into the reaction zone will consequently amount to about 0.005 to about 0.1 pound of alkali compound calculated as the oxide, per hour, per ton of catalyst. When using a catalyst comprising iron or iron oxide as the major component and a temperature between about 450° F. and about 700° F., the amount of alkali compound, such as a potassium compound, injected into the reaction zone to compensate for the loss of the alkali compound will correspond to about 0.02 to about 0.05 pound of the alkali compound calculated as the oxide, per hour, per ton of ferruginous material calculated as the elemental metal. It has been found that if the alkali compound of the catalyst is injected into the reaction zone itself within the above amounts, that the alkali content of the catalyst does not decrease but may be maintained substantially constant at the desired level, thus the selectivity and activity of the catalyst is maintained substantially constant during the process of the reaction.

Conveniently, the alkali compound is injected into the reaction zone by the use of a fluid carrier medium. The carrier medium holds the alkali compound in solution or in suspension, and the carrier medium containing the alkali compound is injected into the reaction zone without adversely affecting the hydrogenation reaction or causing difficulty in the fluidization of the catalyst. Such carrier medium comprises, preferably, a vaporizable liquid which is substantially inert and capable of substantially completely vaporizing at the temperatures and pressures of reaction. Such inert liquid may conveniently comprise an alcohol or other liquid oxygenated organic compounds, water, a hydrocarbon oil, iron carbonyl (pentacarbonyl) or any mixture of these. If the alkali compound is soluble in the liquid carrier medium, it will usually be dissolved therein and injected into the reaction zone. However, since many of the alkali compounds are not soluble in various liquid carrier mediums, the alkali compounds may be merely suspended in the medium as a slurry and the resulting slurry injected into the reaction zone. Using an alcohol, water, or a hydrocarbon oil which is vaporizable at the reaction temperatures and pressures, the carrier medium will vaporize immediately upon injection into the reaction zone and deposit the alkali compound upon the catalyst therein.

Generally, the amount of liquid cooling medium used will be sufficient to dissolve or suspend the required amount of alkali compound but insufficient to cool the reaction zone below the desired reaction temperature. Generally, the liquid carrier medium will be injected into the reaction zone in an amount less than about 15 gallons, per hour, per ton of catalyst. When water is used as the carrier medium, less than about 6 gallons per hour, per ton of catalyst has been found adequate without cooling the reaction zone too much. On the other hand, when a hydrocarbon oil is used, a somewhat greater quantity is usually necessary, up to about 15 gallons, per hour, per ton of catalyst.

In one modification of this invention the alkali compound may be suspended in the recycle gas to the reaction zone instead of a liquid carrier medium. In such a case the recycle gas itself constitutes the carrier medium for the alkali compound in a similar manner as the feed gas often constitutes a carrier medium for fresh catalyst. The use of recycle gas as a carrier medium for the alkali compound is not as desirable as a liquid carrier medium since the liquid carrier medium may be used to greater advantage in controlling the temperature of reaction. Of course, the recycle gas may also control the temperature to some extent since it may be either cooled or preheated before recycling.

Another especially desirable carrier medium is iron carbonyl since the iron carbonyl will decompose at the reaction temperatures and pressures into an active iron catalyst and carbon monoxide, a reactant. For this reason iron carbonyl is a preferred liquid carrier medium.

Since the preferable carrier medium is one which is substantially completely vaporizable at the reaction temperatures and pressures and one which will be substantially non-reactive with the catalyst, still another highly desirable carrier medium comprises a hydrocarbon fraction recovered as a product of the process for the hydrogenation of carbon monoxide. Such a product of the process may comprise a naphtha fraction having a boiling range between about 80° F. and about 195° F. and an A. P. I. gravity of about 84. Instead of the light naphtha, a higher or lower boiling fraction of the process may be employed. Other fractions recovered from the process, such as oxygenated organic compounds, particularly alcohols, may be used as the liquid carrier medium. Alternatively, similar fractions may be obtained from any source and used as the carrier medium. In the selection of a carrier medium from an external source, it is necessary to avoid the introduction of deleterious compounds which may injure the catalyst. For this reason, also, a liquid produced in the process is highly desirable as the carrier medium.

When using a liquid carrier medium which is substantially completely vaporizable at the temperature and pressure of reaction, this medium may provide a means for removal of a substantial proportion of the exothermic heat of reaction. The latent heat of vaporization of the carrier medium will absorb exothermal heat of reaction in the reaction zone and aid in maintaining a relatively constant temperature therein. Consequently the carrier medium may serve two functions: one as a means for transporting the alkali compound to the reaction zone, and as a means for cooling the reaction zone. A carrier medium which serves both of these purposes very satisfactorily is water, since it has a high latent heat of vaporization and because many alkali compounds are soluble therein.

It is not essential that the carrier medium containing the alkali compound be injected directly into the reaction zone itself as it may be injected into the feed line into the reaction zone, into the catalyst standpipe used to transport the catalyst through a catalyst cooler, into the conduit used for reintroducing regenerated catalyst into the process, or any other desirable location in the system in which carrier medium will not cause agglomeration of the catalyst or hinder the flow of the system. It may also be desirable in any instances to inject the carrier medium containing the alkali content at several points into the reaction zone either longitudinally or transversely.

Although the invention has been described with particular emphasis on the type of fluidized catalyst process in which the finely divided catalyst forms a pseudo-liquid dense phase of catalyst in the reaction zone, the invention is equally applicable to the so-called high velocity continuous phase system in which the catalyst passes or is carried through the reaction zone with the gaseous mixture with a minimum amount of slip of the catalyst in the gas. In the high velocity continuous phase system the velocity of the gases are substantially higher than those used for the fluid-bed type system previously decribed and will usually range above about 6 feet per second and as high as 40 feet per second. Using such a high velocity system, the carrier medium containing the alkali compound is usually injected upstream in the reaction zone, although such injection upstream is not essential since the catalyst is recycled.

The invention will be described further by reference to the accompanying drawing, which is a view in elevation, diagrammatically illustrating an arrangement of apparatus suitable for carrying out the present invention in a process for the hydrogenation of carbon monoxide by a pseudo-liquid phase operation.

In the drawing a synthesis feed gas comprising hydrogen and carbon monoxide in a mol ratio of about 1.5:1 to about 2:1 is introduced through conduit 3 into a reactor 4 which comprises an elongated cylindrical chamber. The reaction mixture passes upwardly through reactor 4, preferably at a velocity less than about 6 feet per second and usually about 1 to 2 feet per second under conditions such that a pseudo-liquid dense phase of catalyst is formed in reactor 4. The top of the pseudo-liquid dense phase of catalyst in reactor 4 is designated by numeral 5 and constitutes an interface between the dense phase and the relatively dilute phase in the upper portion of reactor 4. When using a catalyst comprising reduced iron as the major component and containing an alkali compound, according to this invention, operating conditions are a temperature of reaction of about 550° F. to 625° F., a space velocity equivalent to about 2 standard cubic feet of carbon monoxide, per hour, per pound of catalyst in the dense phase and a pressure of about 150 to 400 pounds per square inch gage. A reaction effluent containing the desired products of the process is removed from reactor 4 through outlet conduit 6 and passed to a conventional cyclone separator 7 or similar separating means, such as a Cottrell precipitator or ceramic filter, for the separation of a small amount of entrained catalyst. The entrained catalyst separated from the reaction effluent is withdrawn from separator 7 through conduit 8 for disposal or reintroduction into the process.

The reaction effluent substantially free from entrained catalyst is passed from separator 7 through conduit 9 and a cooler or condenser 11 to an accumulator 12. Condenser 11 is maintained at a temperature of about 150° F. or below and may comprise a single or a series of cooling and condensing units. Accumulator 12 contains two liquid phases: one an aqueous-rich phase, and the other a hydrocarbon-rich phase. Uncondensed gases are removed from accumulator 12 through conduit 13 and may be passed to a recovery system (not shown) for the recovery and purification of valuable products of the process. A portion of the uncondensed gases from accumulator 12 may be recycled through conduits 13 and 14 to feed conduit 3, as shown. The two liquid phases are withdrawn from accumulator 12 through conduit 15 and passed to a recovery and purification system (not shown) for recovery and separation of various products of the process in the conventional manner, such as by distillation, extraction, absorption, etc.

Catalyst may be withdrawn from reactor 4 through a conduit or standpipe 16 for regeneration and/or cooling, if desired. By cooling the catalyst and reintroducing it into reactor 4, at least a portion of the exothermic heat of reaction may be removed and thus provide a means for maintaining the temperature of reaction substantially constant. To aid in achieving a substantially constant reaction temperature, the catalyst is passed through standpipe 16 and through a cooler 17 and re-introduced into conduit 3 through conduit 18. Generally, a sufficient quantity of catalyst is removed and cooled in cooler 17 to a sufficiently low temperature, such as about 300° F. or 400° F., to at least partially control the temperature in reactor 4, as previously described.

During the course of the continuous process of the hydrogenation of carbon monoxide in reactor 4, a substantial proportion of the alkali compound impregnated in the catalyst is lost by volatilization therefrom under the temperatures and pressures of reaction. If the dissipation of the alkali compound from the catalyst were permitted to continue, the characteristic of the catalyst as well as the quantity and the quality of the products of the process would be adversely affected. In order to prevent such a situation and to maintain the alkali content of the catalyst substantially constant, an alkali compound or compounds corresponding generally to the compound comprising the analysis of the catalyst is continuously or intermittently injected into reactor 4 in the following manner. A storage vessel 28 is supplied for holding the alkali compound or compounds to be injected into reactor 4. From storage vessel 28 the alkali compound is passed through a standpipe or conduit 29 to a mixing chamber 21. A suitable liquid carrier medium, such as water or a hydrocarbon oil, is introduced into mixing chamber 21 through conduit 33 in an amount sufficient to dissolve or suspend the alkali compound, as the case may be. From mixing chamber 21 a mixture of the alkali compound and the liquid carrier is circulated through a circulating loop 22 such that the alkali material is maintained in suspension or in solution in the liquid carrier medium. From circulating loop 22 the desired amount of mixture, usually that amount which would correspond to the injection of about 0.03 pound of alkali calculated as the oxide, per hour, per ton of catalyst is injected into the reaction mixture through any or all of conduits 23, 24, 26, and 27.

It is noted that the carrier medium and alkali compound may be injected directly into the catalyst in standpipe 16 through conduit 26. If the catalyst is regenerated, the alkali compound is conveniently admixed therewith after regeneration. The injection of a liquid carrier medium containing the alkali compound into standpipe 16 may serve not only to replenish the alkali content of the catalyst, but also as a means for cooling the catalyst the desired amount before its reintroduction into reactor 4, as previously described. Also, it may be desirable in some instances to inject a portion or all of the carrier medium and alkali compound directly into feed conduit 3 through conduit 27. It is also within the scope of this invention to vary the amount of carrier medium injected longitudinally into reactor 4, such as through conduits 23, 24, and 27. In such instances the largest proportion of the carrier medium containing the alkali compound is injected through conduit 24, since in this portion of reactor 4 the greatest amount of heat is liberated through the exothermic reaction.

An alternative method of introducing the alkali compound into reactor 4, although not as desirable as using a liquid carrier medium, is by passing the alkali compound or compounds from vessel 28 through a standpipe 31 into at least a portion of the recycle gas in conduit 32. The alkali compound which is in a finely divided form is suspended in the flowing mixture of recycle gas and may be passed, with or without cooling or preheating, through conduit 32 and conduits 23, 24, 26, and 27 into the reaction mixture, as previously described with respect to the introduction of the liquid carrier medium.

The alkali compound in a finely divided form may be introduced directly from storage vessel 28 by means of standpipe 29 into conduit 3, conduit 16, or reactor 4 without departing from the scope of this invention.

Although the invention has been described with specific reference to the reaction conditions and to the composition of the catalyst, these conditions and compositions should not be construed as unnecessarily limiting to this invention. Various heaters, compressors, coolers, valves, distillation columns, etc. have been omitted from the drawing as a matter of clarity and convenience. Various modifications of the present invention, especially as to the manner and as to the point of introduction of the alkali compound, may be practiced without departing from the scope of this invention.

The following example is illustrative of the results obtained with and without the teachings of this invention and shows the catalyst composition and yield of hydrocarbon oils and oxygenated organic compounds produced by the hydrogenation of carbon monoxide with a relatively high alkali catalyst containing reduced iron as a major component. Since the example is illustrative only of the application and composition of the catalyst and of the results obtained through the teachings of this invention, it should not be considered unnecessarily limiting to the present invention and is offered merely as a better understanding of the process for the hydrogenation of carbon monoxide with a relatively high alkali catalyst.

The results obtained are presented in conventional tabular form. The yield of observed oil and water may be taken as indications of catalytic activity. The yield of observed oil represents the product cooled in the primary receiver at room temperature and operating pressure and in the secondary receiver at about $-80°$ F. and atmospheric pressure. This yield of oil is not the total yield of organic compounds since it does not include most of the gaseous hydrocarbons made or the organic compounds soluble in the water product. The yield of observed water represents the aqueous layer recovered in the primary and secondary receivers and includes the organic compounds soluble therein.

The inspections on oil and water were obtained by conventional methods of analysis and these data may be used as a measure of catalyst selectivity. The "weight per cent water—K. F. R." is obtained by the use of the Karl Fischer Reagent (K. F. R.) and the differences between that value and 100 per cent is a measure of the organic chemicals contained in the observed water product. Oxygenated organic compounds, such as acids, alcohols, aldehydes, ketones, etc., are not only present in the observed water but are also present to some extent in the observed oil product. The yield of acids contained in the water is expressed as equivalent yield of acetic acid, although higher molecular weight acids are also present.

EXAMPLE

About 1390 grams of $AlCl_3 \cdot 6H_2O$ were dissolved in 1400 cc. of water. The solution was warmed to about 130° F. for a few minutes to dissolve the aluminum chloride. About 13,600 grams of powdered Alan Wood Ore were added to the aluminum chloride solution and agitated for about one-half hour in a mechanical mixer. An additional 1300 cc. of water were required for stirring. The resulting mixture was dried overnight at about 200° F., after which the dried material was pelleted into $\frac{1}{4}$ inch diameter pellets in preparation for calcination. The pelleted material was calcined with air in a gas-fired furnace at a temperature of about 1350° F. for about five hours. The pellets were removed from the gas-fired furnace and ground in a disc mill to a fine powder. About 216 grams of $K_2CO_3$ (C. P.) were dissolved in about 1600 cc. of water. The potassium carbonate solution was admixed with the powdered calcined material and 250 cc. of additional water were added during stirring. The resulting mixture was then dried at a temperature of about 250° F. for several hours. After the Alan Wood Ore had been calcined and treated with the potassium carbonate solution, the material was pelleted and reduced at a temperature between about 1400° F. and 1500° F. for about six hours until the formation of water substantially ceased. After reduction, the reduced material was repulverized in preparation for use as a catalyst. The catalyst composition in parts by weight was approximately 3 parts $Al_2O_3$, 1.5 parts $K_2O$, minor proportions of silica and titania present in the original ore, and about 100 parts iron (Fe).

Table I below shows optimum yields of oil and water obtained in several runs for the hydrogenation of carbon monoxide in the presence of the fresh catalyst as well as in the presence of regenerated catalyst at approximately equivalent space velocities for each run. Runs 1 and 2 show the optimum yield obtained using a fresh catalyst. Runs 3 and 4 show the optimum yield obtained after regeneration of the catalyst by roasting in air at a temperature of about 1200° F. followed by reduction with hydrogen at a temperature between about 1400° F. and about 1500° F. Run 5 shows the optimum yield of oil and water obtained when the alkali content of the catalyst was replenished in accordance with the teachings of this invention. The original catalyst contained about 1.5 parts by weight of potassium calculated as the oxide per hundred parts by weight of iron. After about 1000 hours of use including repeated regeneration, as shown by runs 1, 2, 3, and 4, the alkali content of the catalyst was only about 0.2 part by weight of potassium oxide per hundred parts of iron. Sufficient potassium carbonate was added in run 5 to replenish the alkali content of the catalyst to approximately its former amount.

TABLE I

| Run | Treatment | Reduction Temp. °F. | Optimum Yield—cc./m.³ | | | Hours on Stream |
|---|---|---|---|---|---|---|
| | | | Temp. °F. | Oil | H₂O | |
| 1 | Fresh | 1,505 | 595 | 97 | 109 | 310 |
| 2 | do | 1,480 | 580 | 86 | 74 | 280 |
| 3 | Regenerated | 1,430 | 520 | 23 | 28 | 160 |
| 4 | do | 1,485 | 540 | 41 | 47 | 190 |
| 5 | do | 1,470 | 630 | 87 | 76 | 240 |

Table II indicates the water analysis of product water obtained from runs 1 through 5. Table III shows the analysis of the catalyst after a period of use indicated in runs 1 through 5. After a substantial decrease in the alkali content of the catalyst, a considerable amount of coke formation was obtained on the catalyst, often to such an extent as to make the synthesis operation difficult.

TABLE II
*Water analysis*

| Run | Avg. Yield cc./m.³ | Acid Weight Per Cent CH₃COOH | Total Oxygenated Compounds (K. F. R.) | |
|---|---|---|---|---|
| | | | Weight Per Cent | cc./m.³ |
| 1 | 90 | 1.9 | 14.0 | 16 |
| 2 | 80 | 2.2 | 17.0 | 17 |
| 3 | 49 | 0.2 | 9.0 | 6 |
| 4 | 53 | 0.3 | 12.5 | 8 |
| 5 | 59 | 2.3 | 13.1 | 10 |

TABLE III
*Catalyst composition*

| Run | Oil + Wax Weight Per Cent | Wax M. P. °F | Carbon Weight Per Cent | Hours of Use |
|---|---|---|---|---|
| 1 | 7.0 | 214 | 2.4 | 310 |
| 2 | 2.0 | 226 | 4.2 | 280 |
| 3 | 0.3 | | 6.2 | 160 |
| 4 | 0.1 | | 14.5 | 190 |
| 5 | 3.5 | 239 | 3.6 | 240 |

The oil and water are reported in terms of cc. per cubic meter of total synthesis feed at 32° F. and atmospheric pressure.

It should be noted that upon prolonged use and repeated regeneration of the catalyst that the yield of oil and the amount of acid in the water was substantially decreased. However, by replenishing the alkali content of the catalyst according to this invention the yield and selectivity of the catalyst is maintained relatively high throughout the hydrogenation process, as indicated by the increase in yield of oil and amount of acid in the water product.

Although the reduced iron catalyst of this example has been considered to have an ultimate composition of metallic iron and $K_2O$, the actual composition of the catalyst may contain considerable amounts of unreduced oxides of iron, and the potassium may be present in the catalyst in other forms than as $K_2O$. In all instances the potassium content of the catalyst has been calculated as the oxide based on all iron present calculated as the elementary metal.

I claim:

1. In a process for the hydrogenation of carbon monoxide to produce organic compounds comprising introducing a feed mixture comprising hydrogen and carbon monoxide having a mol ratio of hydrogen to carbon monoxide between about 0.7:1 and about 10:1 into a reaction zone, passing the gaseous mixture upwardly in said reaction zone through a mass comprising a finely-divided hydrogenation catalyst at a velocity sufficiently low to maintain the mass in a dense fluidized pseudo-liquid condition but sufficiently high to produce a rapid circulation of catalyst in the mass, maintaining in said reaction zone a temperature of between about 450 and about 700° F., a pressure between about 150 and about 500 pounds per square inch gage and a space velocity equivalent to at least one standard cubic foot of carbon monoxide per hour per pound of catalyst in said reaction zone, said finely-divided hydrogenation catalyst comprising metallic iron as a major component and containing initially a predetermined amount of between about 0.1 and about 3.0 weight per cent of at least one alkali compound selected from the group consisting of an alkali metal compound and an alkaline earth compound and further characterized by the tendency of the catalyst to lose at least a portion of its alkali content under conditions to which it is subjected, withdrawing a portion of the mass of finely-divided catalyst from said reaction zone, regenerating finely-divided catalyst thus withdrawn from said reaction zone including contact with hydrogen at an elevated temperature and returning regenerated catalyst thus contacted with hydrogen to the reaction zone for reuse, the method for uniformly controlling the alkali content of the catalyst particles which comprises admixing at least one alkali compound selected from the group consisting of an alkali metal compound and an alkaline earth compound with a carrier medium comprising a substantially non-reactive liquid capable of substantially completely volatilizing under the aforesaid conditions of reaction, prior to returning regenerated catalyst to the reaction zone injecting the resulting mixture of carrier medium and alkali compound into the regenerated catalyst thus withdrawn from said reaction zone in an amount sufficient to supply between about 0.005 and about 0.1 pound of alkali compound calculated as the oxide per hour per ton of catalytic material present in said mass of catalyst in said reaction zone but not more than that amount necessary to compensate for the decrease in alkali content of the catalyst, and returning the resulting mixture of regenerated catalyst and alkali compound to said reaction zone whereby the decrease in alkali content of the catalyst mass is at least minimized.

2. The process according to claim 1 in which the alkali compound contained in the catalyst is a potassium compound and the alkali compound injected into the regenerated catalyst is a potassium compound.

3. The process of claim 1 in which said alkali compound contained in the catalyst is an oxygen-containing potassium compound and the alkali compound injected into said regenerated catalyst is potassium carbonate.

4. The process of claim 1 in which said alkali compound contained in the catalyst is a calcium compound and the alkali compound injected into the regenerated catalyst is a calcium compound.

5. The process according to claim 1 in which said alkali compound contained in the catalyst is a sodium compound and the alkali compound injected into the regenerated catalyst is a sodium compound.

6. The process of claim 1 in which said liquid carrier medium is a light naphtha fraction recovered as a product of the process.

7. The process of claim 1 in which said liquid carrier medium is water.

8. The process of claim 1 in which said liquid carrier medium is iron carbonyl.

9. In a process for the hydrogenation of carbon monoxide to produce organic compounds comprising introducing a feed mixture comprising hydrogen and carbon monoxide having a mol ratio of hydrogen to carbon monoxide between about 0.7:1 and about 10:1 into a reaction zone, passing the gaseous mixture upwardly in said reaction zone in contact with a finely-divided hydrogenation catalyst at a velocity such that said finely-divided catalyst is suspended in a fluidized condition in said flowing gaseous mixture, maintaining in said reaction zone a temperature between about 350 and about 750° F. and a pressure between about 50 and about 500 pounds per square inch gage, said finely-divided hydrogenation catalyst comprising metallic iron as the major component and containing initially a predetermined amount of between about 0.1 and about 3.0 per cent by weight of at least one alkali compound selected from the group consisting of an alkali metal compound and an alkaline earth compound and further characterized by the tendency of the catalyst to lose at least a portion of its alkali content under conditions to which it is subjected, removing finely-divided catalyst from said reaction zone treating catalyst thus withdrawn under conditions such that alkali is removed from the catalyst and returning treated catalyst to said reaction zone, the method for uniformly controlling the alkali content of the catalyst particles which comprises, prior to returning withdrawn catalyst to the reaction zone, admixing at least one alkali compound selected from the group consisting of an alkali metal compound and an alkaline earth compound with the treated catalyst in an amount sufficient to at least partially compensate for the loss in alkali content of the catalyst but insufficient to increase the alkali content over the initial predetermined amount, and returning the resulting mixture of catalyst and alkali to said reaction zone for reuse.

10. In a process for the hydrogenation of carbon monoxide to produce organic compounds comprising introducing a feed mixture comprising hydrogen and carbon monoxide as the principal reactants having a mol ratio of hydrogen to carbon monoxide between about 0.7:1 and about 10:1 into a reaction zone, passing the gaseous mixture upwardly in said reaction zone in contact with the finely-divided hydrogenation catalyst such that the catalyst is suspended in a fluidized condition in said gaseous mixture, said finely-divided hydrogenation catalyst consisting essentially of metallic iron and containing initially a predetermined amount of between about 0.8 and about 2.0 weight per cent of at least one alkali compound selected from the group consisting of an alkali metal compound and an alkaline earth compound calculated as the oxide and further characterized by the tendency of the catalyst to lose at least a portion of its alkali content under conditions to which it is subjected, maintaining a temperature of reaction between about 550 and about 625° F. and a pressure between about 150 and about 400 pounds per square inch gage, withdrawing finely-divided catalyst from said reaction zone, subjecting said finely-divided catalyst thus withdrawn from said reaction zone to contact with hydrogen at an elevated temperature and returning catalyst thus contacted with hydrogen to said reaction zone for reuse, the method for uniformly controlling the alkali content of the catalyst particles which comprises, prior to returning hydrogen-treated catalyst to the reaction zone admixing with finely-divided hydrogen treated catalyst at least one alkali compound selected from the group consisting of an alkali metal compound and an alkaline earth compound in an amount sufficient to at least partially compensate for the loss of alkali content but insufficient to increase the alkali content over the initial predetermined amount, and returning the resulting mixture of finely-divided catalyst and alkali compound to said reaction zone whereby the decrease in alkali content of the catalyst is at least minimized.

11. In a process for the hydrogenation of a carbon oxide to produce organic compounds in the presence of a fluidized catalyst in which a feed mixture comprising hydrogen and a carbon oxide having a mol ratio of hydrogen to carbon oxide between about 0.7:1 and about 10.1 is introduced into a reaction zone and is contacted with a fluidized hydrogenation catalyst at a temperature between about 350 and about 750° F., said hydrogenation catalyst comprising iron as the major component and containing initially a predetermined amount of between about 0.1 and about 3.0 weight per cent of at least one alkali compound selected from the group consisting of an alkali metal compound and an alkaline earth compound and further characterized by the tendency of the catalyst to lose at least a portion of its alkali content under conditions to which it is subjected, and in which process used hydrogenation catalyst is withdrawn from the reaction zone and subjected to regeneration including contact with hydrogen at an elevated temperature and is subsequently returned to said reaction zone for reuse, the method for uniformly controlling the alkali content of the catalyst particles which comprises prior to returning regenerated catalyst to the reaction zone admixing with the regenerated catalyst at least one alkali compound selected from the group consisting of an alkali metal compound and an alkaline earth compound in an amount at least sufficient to partially compensate for the decrease in alkali content of the catalyst but insufficient to increase the alkali content of the catalyst over the initial predetermined amount.

WILLIAM P. BURTON.

REFERENCES CITED

The following references are of record in the file of this patent:

UNITED STATES PATENTS

| Number | Name | Date |
|---|---|---|
| 2,237,339 | De Florez | Apr. 8, 1941 |
| 2,254,806 | Michael | Sept. 2, 1941 |
| 2,347,682 | Gunness | May 2, 1944 |
| 2,360,787 | Murphree | Oct. 17, 1944 |
| 2,395,875 | Kearby | May 5, 1946 |
| 2,408,139 | Gutzeit | Sept. 24, 1946 |
| 2,464,480 | Beck | Mar. 15, 1949 |
| 2,479,439 | Voorhies | Aug. 16, 1949 |

OTHER REFERENCES

Audibert et al., "Action of Iron Catalyst—Hydrogen," Ind. Eng. Chem. Vol. 21, No. 9 (September 1929), pages 880–885 (6 pages).

U. S. Naval Technical Mission In Europe Report No. 248-45, The Synthesis of Hydrocarbons and Chemicals from CO and $H_2$, pages ½ and 62 (2 pages, page ½ is title page), September 1945.